United States Patent
Michitaka et al.

(10) Patent No.: US 9,428,602 B2
(45) Date of Patent: Aug. 30, 2016

(54) (METH)ACRYLIC ACID COPOLYMER AND METHOD FOR PRODUCING SAME

(71) Applicant: NIPPON SHOKUBAI CO., LTD., Osaka-shi, Osaka (JP)

(72) Inventors: Daisuke Michitaka, Suita (JP); Atsuro Yoneda, Suita (JP); Kenji Kuwada, Suita (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 0 days.

(21) Appl. No.: 14/900,353

(22) PCT Filed: Sep. 11, 2014

(86) PCT No.: PCT/JP2014/074059
§ 371 (c)(1),
(2) Date: Dec. 21, 2015

(87) PCT Pub. No.: WO2015/045883
PCT Pub. Date: Apr. 2, 2015

(65) Prior Publication Data
US 2016/0194423 A1    Jul. 7, 2016

(30) Foreign Application Priority Data

Sep. 24, 2013 (JP) ................................ 2013-196364
Sep. 5, 2014 (JP) ................................ 2014-180704

(51) Int. Cl.
*C08F 220/06* (2006.01)

(52) U.S. Cl.
CPC .................................. *C08F 220/06* (2013.01)

(58) Field of Classification Search
CPC .................................................. C08F 220/06
USPC ........................................................... 526/287
See application file for complete search history.

(56) References Cited

U.S. PATENT DOCUMENTS

| 4,618,448 | A | * | 10/1986 | Cha | ........................ | C02F 5/10 |
| | | | | | | 210/696 |
| 5,124,046 | A | | 6/1992 | Sherwood et al. | | |
| 7,390,776 | B2 | | 6/2008 | Tsumori et al. | | |
| 2005/0003993 | A1 | | 1/2005 | Tsumori et al. | | |

FOREIGN PATENT DOCUMENTS

| JP | 61-114797 A | 6/1986 |
| JP | 2-40298 A | 2/1990 |
| JP | 07-172891 A | 7/1995 |
| JP | 2000-034151 A | 2/2000 |
| JP | 2002-003536 A | 1/2002 |
| JP | 2004-217891 A | 8/2004 |
| JP | 2012-188586 A | 10/2012 |
| WO | 2012/105239 A1 | 8/2012 |

* cited by examiner

*Primary Examiner* — Ling Choi
*Assistant Examiner* — Chun-Cheng Wang
(74) *Attorney, Agent, or Firm* — Sughrue Mion, PLLC

(57) ABSTRACT

Provided is a (meth)acrylic acid-based copolymer containing, as structural units, a structural unit derived from a sulfonic acid (salt) group-containing monomer and a structural unit derived from (meth)acrylic acid (salt), the copolymer being capable of expressing an excellent effect on the dispersion of hydrophobic particles. Also provided is a method of producing such (meth)acrylic acid-based copolymer. A (meth)acrylic acid-based copolymer of the present invention contains: 1 mass % to 20 mass % of a structural unit (a) derived from an ether bond-containing hydrophobic monomer (A) represented by a specific structure; 1 mass % to 50 mass % of a structural unit (b) derived from a sulfonic acid (salt) group-containing monomer (B) represented by a specific structure; and 30 mass % to 98 mass % of a structural unit (c) derived from (meth)acrylic acid (salt) (C).

10 Claims, No Drawings

(METH)ACRYLIC ACID COPOLYMER AND METHOD FOR PRODUCING SAME

TECHNICAL FIELD

The present invention relates to a (meth)acrylic acid-based copolymer and a method of producing the copolymer.

BACKGROUND ART

A (meth)acrylic acid-based copolymer can express an excellent chelating action and an excellent dispersing action because the copolymer has many carboxyl groups or salts thereof. Accordingly, the (meth)acrylic acid-based copolymer can be used in various applications, such as a dispersant, a water treatment agent, and a scale inhibitor.

As the (meth)acrylic acid-based copolymer capable of expressing an excellent chelating action and an excellent dispersing action, there has been proposed a (meth)acrylic acid-based copolymer containing, as structural units, a structural unit derived from a sulfonic acid (salt) group-containing monomer and a structural unit derived from (meth)acrylic acid (salt) (see, for example, Patent Literatures 1 and 2).

However, such related-art (meth)acrylic acid-based copolymer containing, as structural units, a structural unit derived from a sulfonic acid (salt) group-containing monomer and a structural unit derived from (meth)acrylic acid (salt) as described above involves a problem in that the copolymer cannot express a sufficient effect on the dispersion of hydrophobic particles, though the copolymer can express an excellent effect on the dispersion of charged particles.

CITATION LIST

Patent Literature

[PTL 1] JP 2002-3536 A
[PTL 2] JP 2012-188586 A

SUMMARY OF INVENTION

Technical Problem

An object of the present invention is to provide a (meth)acrylic acid-based copolymer containing, as structural units, a structural unit derived from a sulfonic acid (salt) group-containing monomer and a structural unit derived from (meth)acrylic acid (salt), the copolymer being capable of expressing an excellent effect on the dispersion of hydrophobic particles. Another object of the present invention is to provide a method of producing such (meth)acrylic acid-based copolymer.

Solution to Problem

A (meth)acrylic acid-based copolymer according to one embodiment of the present invention includes: 1 mass % to 20 mass % of a structural unit (a) derived from an ether bond-containing hydrophobic monomer (A) represented by the general formula (1); 1 mass % to 50 mass % of a structural unit (b) derived from a sulfonic acid (salt) group-containing monomer (B) represented by the general formula (6); and 30 mass % to 98 mass % of a structural unit (c) derived from (meth)acrylic acid (salt) (C):

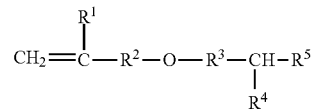

in the general formula (1), $R^1$ represents a hydrogen atom or a methyl group, $R^2$ represents an alkylene group having 1 to 10 carbon atoms, $R^3$ represents an alkylene group having 1 to 10 carbon atoms, $R^4$ represents H or a hydroxyl group, $R^5$ represents an $-OR^6$ group or $R^6$, and $R^6$ represents an alkyl group having 1 to 20 carbon atoms;

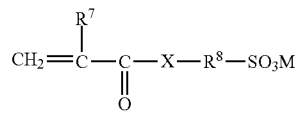

in the general formula (6), $R^7$ represents a hydrogen atom or a methyl group, X represents $-NH-$ or $-O-$, $R^8$ represents an alkylene group having 1 to 10 carbon atoms, and M represents a hydrogen atom, a metal atom, an ammonium group, which constitutes an ammonium salt, i.e., $SO_3NH_4$, or an organic amino group, which constitutes an organic amine salt.

In a preferred embodiment, the (meth)acrylic acid-based copolymer of the present invention has a weight-average molecular weight of from 5,000 to 1,000,000.

In a preferred embodiment, the monomer (A) is at least one kind selected from 1-allyloxy-3-butoxypropan-2-ol represented by the chemical formula (2), a hexene oxide adduct of isoprenol represented by the chemical formula (3), and allyl butyl ether represented by the chemical formula (4).

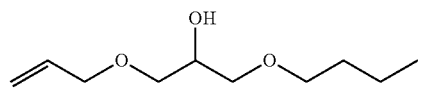

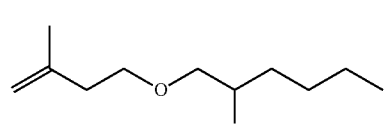

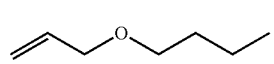

In a preferred embodiment, the monomer (B) is 2-acrylamido-2-methylpropanesulfonic acid (salt) represented by the chemical formula (5):

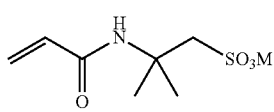

in the chemical formula (5), M represents a hydrogen atom, a metal atom, an ammonium group, which constitutes an ammonium salt, i.e., $SO_3NH_4$, or an organic amino group, which constitutes an organic amine salt.

A method of producing a (meth)acrylic acid-based copolymer according to one embodiment of the present invention includes polymerizing monomers including an ether bond-containing hydrophobic monomer (A) represented by the general formula (1), a sulfonic acid (salt) group-containing monomer (B) represented by the general formula (6), and (meth)acrylic acid (salt) (C) to produce a (meth)acrylic acid-based copolymer, the monomer (A), the monomer (B), and the (meth)acrylic acid (salt) (C) being used at a ratio of 1 mass % to 20 mass %/1 mass % to 50 mass %/30 mass % to 98 mass %:

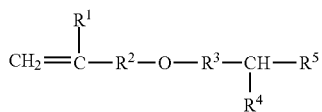
(1)

in the general formula (1), $R^1$ represents a hydrogen atom or a methyl group, $R^2$ represents an alkylene group having 1 to 10 carbon atoms, $R^3$ represents an alkylene group having 1 to 10 carbon atoms, $R^4$ represents H or a hydroxyl group, $R^5$ represents an $-OR^6$ group or $R^6$, and $R^6$ represents an alkyl group having 1 to 20 carbon atoms;

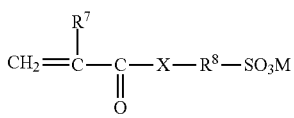
(6)

in the general formula (6), $R^7$ represents a hydrogen atom or a methyl group, X represents $-NH-$ or $-O-$, $R^8$ represents an alkylene group having 1 to 10 carbon atoms, and M represents a hydrogen atom, a metal atom, an ammonium group, which constitutes an ammonium salt, i.e., $SO_3NH_4$, or an organic amino group, which constitutes an organic amine salt.

In a preferred embodiment, the monomer (A) is at least one kind selected from 1-allyloxy-3-butoxypropan-2-ol represented by the chemical formula (2), a hexene oxide adduct of isoprenol represented by the chemical formula (3), and allyl butyl ether represented by the chemical formula (4).

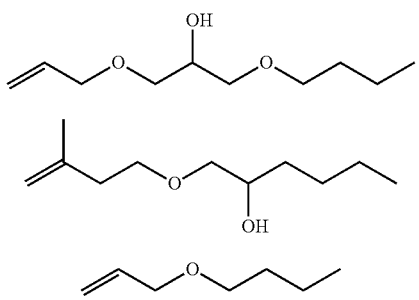

In a preferred embodiment, the monomer (B) is 2-acrylamido-2-methylpropanesulfonic acid (salt) represented by the chemical formula (5):

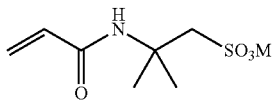
(5)

in the chemical formula (5), M represents a hydrogen atom, a metal atom, an ammonium group, which constitutes an ammonium salt, i.e., $SO_3NH_4$, or an organic amino group, which constitutes an organic amine salt.

Advantageous Effects of Invention

According to the one embodiment of the present invention, the (meth)acrylic acid-based copolymer containing, as structural units, a structural unit derived from a sulfonic acid (salt) group-containing monomer and a structural unit derived from (meth)acrylic acid (salt), the copolymer being capable of expressing an excellent effect on the dispersion of hydrophobic particles can be provided. According to the one embodiment of the present invention, the method of producing such (meth)acrylic acid-based copolymer can be provided.

DESCRIPTION OF EMBODIMENTS

<<(Meth)Acrylic Acid-Based Copolymer>>

A (meth)acrylic acid-based copolymer of the present invention includes: 1 mass % to 20 mass % of a structural unit (a) derived from an ether bond-containing hydrophobic monomer (A) represented by the general formula (1); 1 mass % to 50 mass % of a structural unit (b) derived from a sulfonic acid (salt) group-containing monomer (B) represented by the general formula (6); and 30 mass % to 98 mass % of a structural unit (c) derived from (meth)acrylic acid (salt) (C).

$$CH_2=\overset{R^1}{\underset{}{C}}-R^2-O-R^3-\underset{R^4}{\overset{}{CH}}-R^5 \quad (1)$$

(In the general formula (1), $R^1$ represents a hydrogen atom or a methyl group, $R^2$ represents an alkylene group having 1 to 10 carbon atoms, $R^3$ represents an alkylene group having 1 to 10 carbon atoms, $R^4$ represents H or a hydroxyl group, $R^5$ represents an $-OR^6$ group or $R^6$, and $R^6$ represents an alkyl group having 1 to 20 carbon atoms.)

$$CH_2=\overset{R^7}{\underset{}{C}}-\underset{\underset{O}{\parallel}}{C}-X-R^8-SO_3M \quad (6)$$

(In the general formula (6), $R^7$ represents a hydrogen atom or a methyl group, X represents $-NH-$ or $-O-$, $R^8$ represents an alkylene group having 1 to 10 carbon atoms, and M represents a hydrogen atom, a metal atom, an ammonium group, which constitutes an ammonium salt, i.e., $SO_3NH_4$, or an organic amino group, which constitutes an organic amine salt.)

It should be noted that the term "(meth)acryl" as used herein means acryl and/or methacryl.

In the general formula (1), $R^1$ represents a hydrogen atom or a methyl group.

In the general formula (1), $R^2$ represents an alkylene group having 1 to 10 carbon atoms, preferably an alkylene group having 1 to 8 carbon atoms, more preferably an alkylene group having 1 to 5 carbon atoms, still more preferably an alkylene group having 1 to 3 carbon atoms, particularly preferably an alkylene group having 1 or 2 carbon atoms (i.e., —$CH_2$— or —$CH_2CH_2$—).

In the general formula (1), $R^3$ represents an alkylene group having 1 to 10 carbon atoms, preferably an alkylene group having 1 to 8 carbon atoms, more preferably an alkylene group having 1 to 5 carbon atoms, still more preferably an alkylene group having 1 to 3 carbon atoms, particularly preferably an alkylene group having 1 or 2 carbon atoms, most preferably an alkylene group having 1 carbon atom (i.e., —$CH_2$—).

In the general formula (1), $R^4$ represents H or a hydroxyl group.

In the general formula (1), $R^5$ represents an —$OR^6$ group or $R^6$, and $R^6$ represents an alkyl group having 1 to 20 carbon atoms, preferably an alkyl group having 1 to 18 carbon atoms, more preferably an alkyl group having 1 to 13 carbon atoms, still more preferably an alkyl group having 1 to 8 carbon atoms, particularly preferably an alkyl group having 1 to 5 carbon atoms.

When the ether bond-containing hydrophobic monomer (A) is such compound represented by the general formula (1) as described above, the (meth)acrylic acid-based copolymer of the present invention can express an excellent effect on the dispersion of hydrophobic particles.

The ether bond-containing hydrophobic monomer (A) is particularly preferably at least one kind selected from 1-allyloxy-3-butoxypropan-2-ol represented by the chemical formula (2), a hexene oxide adduct of isoprenol represented by the chemical formula (3), and allyl butyl ether represented by the chemical formula (4).

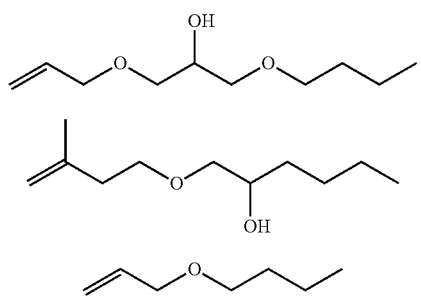

(2)

(3)

(4)

When the ether bond-containing hydrophobic monomer (A) is at least one kind selected from 1-allyloxy-3-butoxypropan-2-ol represented by the chemical formula (2), the hexene oxide adduct of isoprenol represented by the chemical formula (3), and allyl butyl ether represented by the chemical formula (4), the (meth)acrylic acid-based copolymer of the present invention can additionally express an excellent effect on the dispersion of hydrophobic particles.

The structural unit (a) derived from the ether bond-containing hydrophobic monomer (A) is a structure obtained by turning an unsaturated double bond in the general formula (1) into a saturated bond through a polymerization reaction, and is represented by the general formula (1a).

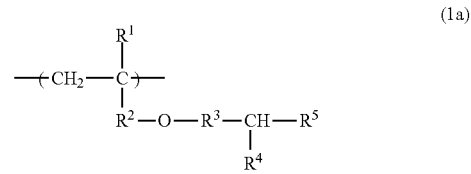

(1a)

(In the general formula (1a), $R^1$ represents a hydrogen atom or a methyl group, $R^2$ represents an alkylene group having 1 to 10 carbon atoms, $R^3$ represents an alkylene group having 1 to 10 carbon atoms, $R^4$ represents H or a hydroxyl group, $R^5$ represents an —$OR^6$ group or $R^6$, and $R^6$ represents an alkyl group having 1 to 20 carbon atoms.)

The respective symbols and the like in the general formula (1a) are the same as the contents described for the general formula (1).

The (meth)acrylic acid-based copolymer of the present invention may contain only one kind of the structural units (a) each derived from the ether bond-containing hydrophobic monomer (A) represented by the general formula (1), or may contain two or more kinds thereof.

A (meth)acrylic acid derivative having a sulfonic acid (salt) group at a terminal thereof, the derivative being represented by the general formula (6), is free of an ether bond (an ethereal —O— bond). It should be noted that the ethereal —O— bond is different from an —O— bond in an ester bond (an —O— bond in a COO bond).

It should be noted that the term "sulfonic acid (salt)" as used herein means a sulfonic acid and/or a salt thereof, and the salt means the case where the M represents a metal atom (a metal salt), an ammonium group, which constitutes an ammonium salt, i.e., $SO_3NH_4$, or an organic amino group, which constitutes an organic amine salt.

In the general formula (6), $R^7$ represents a hydrogen atom or a methyl group.

In the general formula (6), X represents —NH— or —O—.

In the general formula (6), $R^8$ represents an alkylene group having 1 to 10 carbon atoms, preferably an alkylene group having 1 to 8 carbon atoms, more preferably an alkylene group having 1 to 5 carbon atoms, still more preferably an alkylene group having 1 to 4 carbon atoms, particularly preferably an alkylene group having 2 to 4 carbon atoms (i.e., —$CH_2CH_2$—, —$CH_2CH_2CH_2$—, —$CH(CH_3)$ $CH_2$—, —$CH_2CH_2CH_2CH_2$—, —$CH(CH_3)$ $CH_2CH_2$—, —$CH_2CH(CH_3)$ $CH_2$—, —$CH_2CH_2CH(CH_3)$—, —$C(CH_3)(CH_3)$ $CH_2$—, —$CH_2C(CH_3)(CH_3)$—, —$CH(CH_2CH_3)$ $CH_2$—, —$CH_2CH(CH_2CH_3)$—, —$CH(CH_3)CH(CH_3)$—, —$C(CH_2CH_2CH_3)$—, or —$C(CH(CH_3) (CH_3))$—).

In the general formula (6), M represents a hydrogen atom, a metal atom, an ammonium group, which constitutes an ammonium salt, i.e., $COONH_4$, or an organic amino group, which constitutes an organic amine salt. Examples of the metal atom include: alkali metals, such as a sodium atom and a potassium atom; alkaline earth metals, such as a calcium atom; and transition metals, such as an iron atom. Examples of the organic amine salt include primary to quaternary amine salts, such as a methylamine salt, a n-butylamine salt, a monoethanolamine salt, a dimethylamine salt, a diethanolamine salt, a morpholine salt, and a trimethylamine salt.

When the sulfonic acid (salt) group-containing monomer (B) is such compound represented by the general formula (6) as described above, the (meth)acrylic acid-based copolymer of the present invention can express an excellent effect on the dispersion of hydrophobic particles.

The sulfonic acid (salt) group-containing monomer (B) is preferably 2-acrylamido-2-methylpropanesulfonic acid (salt) represented by the chemical formula (5) or 2-sulfoethylmethacrylate (salt) represented by the chemical formula (7), particularly preferably 2-acrylamido-2-methylpropanesulfonic acid (salt) represented by the chemical formula (5). When the sulfonic acid (salt) group-containing monomer (B) is 2-acrylamido-2-methylpropanesulfonic acid (salt), the (meth)acrylic acid-based copolymer of the present invention can additionally express an excellent effect on the dispersion of hydrophobic particles.

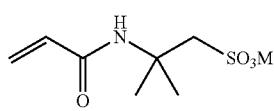

(5)

(In the chemical formula (5), M represents a hydrogen atom, a metal atom, an ammonium group, which constitutes an ammonium salt, i.e., $SO_3NH_4$, or an organic amino group, which constitutes an organic amine salt.)

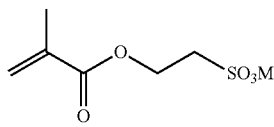

(7)

(In the chemical formula (7), M represents a hydrogen atom, a metal atom, an ammonium group, which constitutes an ammonium salt, i.e., $SO_3NH_4$, or an organic amino group, which constitutes an organic amine salt.) The structural unit (b) derived from the sulfonic acid (salt) group-containing monomer (B) is a structure obtained by turning an unsaturated double bond in the sulfonic acid (salt) group-containing monomer (B) into a saturated bond through a polymerization reaction, and is represented by the general formula (6a) in, for example, the case where the sulfonic acid (salt) group-containing monomer (B) is represented by the general formula (6).

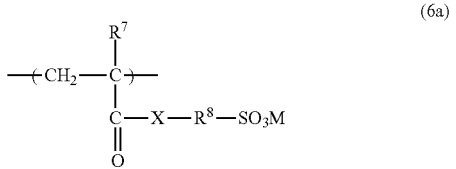

(6a)

(In the general formula (6a), $R^7$ represents a hydrogen atom or a methyl group, X represents —NH— or —O—, $R^8$ represents an alkylene group having 1 to 10 carbon atoms, and M represents a hydrogen atom, a metal atom, an ammonium group, which constitutes an ammonium salt, i.e., $SO_3NH_4$, or an organic amino group, which constitutes an organic amine salt.)

The respective symbols and the like in the general formula (6a) are the same as the contents described for the general formula (6).

The (meth)acrylic acid-based copolymer of the present invention may contain only one kind of the structural units (b) each derived from the sulfonic acid (salt) group-containing monomer (B), or may contain two or more kinds thereof.

The term "(meth)acrylic acid (salt) (C)" means acrylic acid (salt) and/or methacrylic acid (salt). The term "acrylic acid (salt)" means acrylic acid and/or an acrylate, and the term "methacrylic acid (salt)" means methacrylic acid and/or a methacrylate.

The term "salt" refers to a salt of a carboxyl group represented by COOM, and M represents a metal atom, an ammonium group, which constitutes an ammonium salt, i.e., $COONH_4$, or an organic amino group, which constitutes an organic amine salt. Examples of the metal atom include: alkali metals, such as a sodium atom and a potassium atom; alkaline earth metals, such as a calcium atom; and transition metals, such as an iron atom. Examples of the organic amine salt include primary to quaternary amine salts, such as a methylamine salt, a n-butylamine salt, a monoethanolamine salt, a dimethylamine salt, a diethanolamine salt, a morpholine salt, and a trimethylamine salt.

The structural unit (c) derived from the (meth)acrylic acid (salt) (C) is a structural unit of a polymer structure formed by the polymerization of (meth)acrylic acid (salt), and is a structural unit represented by $—[CH_2—CR^9(COOM^1)]—$. In the formula, $R^9$ represents a hydrogen atom or a methyl group. In addition, $M^1$ represents a hydrogen atom, a metal atom, an ammonium group, which constitutes an ammonium salt, i.e., $COONH_4$, or an organic amino group, which constitutes an organic amine salt. Such metal atom, ammonium group, and organic amino group are the same as those described for the M.

The (meth)acrylic acid-based copolymer of the present invention may contain only one kind of the structural units (c) each derived from the (meth)acrylic acid (salt) (C), or may contain two or more kinds thereof.

The (meth)acrylic acid-based copolymer of the present invention contains: 1 mass % to 20 mass % of the structural unit (a) derived from the ether bond-containing hydrophobic monomer (A) represented by the general formula (1); 1 mass % to 50 mass % of the structural unit (b) derived from the sulfonic acid (salt) group-containing monomer (B); and 30 mass % to 98 mass % of the structural unit (c) derived from the (meth)acrylic acid (salt) (C). When the ratios of the structural unit (a), the structural unit (b), and the structural unit (c) in the (meth)acrylic acid-based copolymer of the present invention fall within the ranges, the (meth)acrylic acid-based copolymer of the present invention can express an excellent effect on the dispersion of hydrophobic particles. It should be noted that the ratios refer to ratios with respect to all structural units derived from all monomers constituting the (meth)acrylic acid-based copolymer of the present invention.

In the (meth)acrylic acid-based copolymer of the present invention, the content of the structural unit (a) derived from the ether bond-containing hydrophobic monomer (A) represented by the general formula (1) is from 1 mass % to 20 mass %, and is preferably from 1 mass % to 19 mass %, more preferably from 1 mass % to 18 mass %, still more preferably from 2 mass % to 17 mass %, particularly preferably from 3 mass % to 15 mass %, most preferably from 5 mass % to 15 mass % in view of being capable of expressing the effects of the present invent ion in an additionally effective manner. It should be noted that the content is a ratio with respect to all structural units derived from all monomers constituting the (meth)acrylic acid-based copolymer of the present invention.

In the (meth)acrylic acid-based copolymer of the present invention, the content of the structural unit (b) derived from the sulfonic acid (salt) group-containing monomer (B) is from 1 mass % to 50 mass %, and is preferably from 4 mass % to 45 mass %, more preferably from 6 mass % to 40 mass %, still more preferably from 7 mass % to 35 mass %, particularly preferably from 8 mass % to 30 mass %, most preferably from 10 mass % to 30 mass % in view of being capable of expressing the effects of the present invention in an additionally effective manner. It should be noted that the content is a ratio with respect to all structural units derived from all monomers constituting the (meth)acrylic acid-based copolymer of the present invention.

In the (meth)acrylic acid-based copolymer of the present invention, the content of the structural unit (c) derived from the (meth)acrylic acid (salt) (C) is from 30 mass % to 98 mass %, and is preferably from 36 mass % to 95 mass %, more preferably from 42 mass % to 93 mass %, still more preferably from 48 mass % to 91 mass %, particularly preferably from 55 mass % to 89 mass %, most preferably from 55 mass % to 85 mass % in view of being capable of expressing the effects of the present invention in an additionally effective manner. It should be noted that the content is a ratio with respect to all structural units derived from all monomers constituting the (meth)acrylic acid-based copolymer of the present invention.

The (meth)acrylic acid-based copolymer of the present invention may have a structural unit (d) derived from any other monomer (D) except the structural unit (a) derived from the ether bond-containing hydrophobic monomer (A) represented by the general formula (1), the structural unit (b) derived from the sulfonic acid (salt) group-containing monomer (B), and the structural unit (c) derived from the (meth)acrylic acid (salt) (C) to the extent that the effects of the present invention are not impaired. The structural unit (d) derived from the other monomer (D) is a structural unit of a polymer structure formed by the polymerization of the other monomer (D).

Any appropriate monomer can be adopted as the other monomer (D) to the extent that the effects of the present invention are not impaired. Examples of such other monomer (D) include: (meth)acrylic acid (salt)-based monomers, such as crotonic acid (salt), α-hydroxyacrylic acid (salt), α-hydroxymethylacrylic acid (salt), and derivatives thereof; unsaturated dicarboxylic acid (salt)-based monomers, such as itaconic acid (salt), fumaric acid (salt), maleic acid (salt), and 2-methyleneglutaric acid (salt); polyalkylene glycol chain-containing monomers, such as a monomer obtained by adding an alkylene oxide to (meth)allyl alcohol or isoprenol and a (meth)acrylic acid ester of an alkoxyalkylene glycol; N-vinyl monomers, such as N-vinylpyrrolidone, N-vinylformamide, N-vinylacetamide, N-vinyl-N-methylformamide, N-vinyl-N-methylacetamide, and N-vinyloxazolidone; amide-based monomers, such as (meth)acrylamide, N,N-dimethylacrylamide, and N-isopropylacrylamide; allyl ether-based monomers, such as (meth)allyl alcohol; isoprene-based monomers, such as isoprenol; (meth)acrylic acid alkyl ester-based monomers, such as butyl (meth)acrylate, 2-ethylhexyl (meth)acrylate, and dodecyl (meth)acrylate; hydroxyalkyl (meth)acrylate-based monomers, such as hydroxyethyl (meth)acrylate, 2-hydroxyethyl (meth)acrylate, hydroxypropyl (meth)acrylate, hydroxybutyl (meth)acrylate, 2-hydroxybutyl (meth)acrylate, 4-hydroxybutyl (meth)acrylate, α-hydroxymethylethyl (meth)acrylate, hydroxypentyl(meth)acrylate, hydroxyneopentyl (meth)acrylate, and hydroxyhexyl (meth)acrylate; vinylaryl monomers, such as styrene, indene, and vinylaniline; isobutylene; vinyl acetate; vinyl aromatic-based amino group-containing monomers each having a heterocyclic aromatic hydrocarbon group and an amino group, such as vinylpyridine and vinylimidazole, and quaternized products and salts thereof; aminoalkyl (meth)acrylates, such as dimethylaminoethyl acrylate, dimethylaminoethyl methacrylate, dimethylaminopropyl acrylate, and aminoethyl methacrylate, and quaternized products and salts thereof; allylamines, such as diallylamine and diallyldimethylamine, and quaternized products and salts thereof; and monomers each obtained by subjecting (i) an epoxy ring of (meth)allyl glycidyl ether, isoprenyl glycidyl ether, vinyl glycidyl ether, or the like to a reaction with (ii) an amine, such as a dialkylamine, e.g., dimethylamine, diethylamine, diisopropylamine, or di-n-butylamine, an alkanolamine, e.g., diethanolamine or diisopropanolamine, an aminocarboxylic acid, e.g., iminodiacetic acid or glycine, or a cyclic amine, e.g., morpholine or pyrrole, and quaternized products and salts thereof.

The (meth)acrylic acid-based copolymer of the present invention may contain only one kind of the structural units (d) each derived from the other monomer (D), or may contain two or more kinds thereof.

In the (meth)acrylic acid-based copolymer of the present invention, the content of the structural unit (d) derived from the other monomer (D) is preferably from 0 mass % to 68 mass %, more preferably from 0 mass % to 60 mass %, still more preferably from 0 mass % to 50 mass %, particularly preferably from 0 mass % to 40 mass % in view of being capable of expressing the effects of the present invention in an additionally effective manner. It should be noted that the content is a ratio with respect to all structural units derived from all monomers constituting the (meth)acrylic acid-based copolymer of the present invention.

The (meth)acrylic acid-based copolymer of the present invention has a weight-average molecular weight of from 3,000 to 1,000,000, preferably from 4,000 to 500,000, more preferably from 5,000 to 100,000, still more preferably from 6,000 to 50,000, particularly preferably from 7,000 to 20,000. When the weight-average molecular weight of the (meth)acrylic acid-based copolymer of the present invention falls within the range, the (meth)acrylic acid-based copolymer of the present invention can express an additionally excellent effect on the dispersion of hydrophobic particles.

<<Method of Producing (Meth)Acrylic Acid-Based Copolymer>>

A method of producing a (meth)acrylic acid-based copolymer of the present invention is a method including polymerizing monomers including an ether bond-containing hydrophobic monomer (A), a sulfonic acid (salt) group-containing monomer (B), and (meth)acrylic acid (salt) (C) to produce a (meth)acrylic acid-based copolymer, the monomer (A), the monomer (B), and the (meth)acrylic acid (salt) (C) being used at a ratio of 1 mass % to 20 mass %/1 mass % to 50 mass %/30 mass % to 98 mass %.

A batch polymerization method is preferably adopted as the method of producing an acrylic acid-based copolymer of the present invention, but a continuous polymerization method is also permitted. The adoption of the method can shorten a production time or reduce the amount of a remaining monomer.

The ether bond-containing hydrophobic monomer (A), sulfonic acid (salt) group-containing monomer (B), and (meth)acrylic acid (salt) (C) to be used in the method of producing a (meth)acrylic acid-based copolymer of the present invention are the same as those in the description of the (meth)acrylic acid-based copolymer of the present invention.

In the method of producing a (meth)acrylic acid-based copolymer of the present invention, only one kind of the ether bond-containing hydrophobic monomers (A) may be used, or two or more kinds thereof may be used.

In the method of producing a (meth)acrylic acid-based copolymer of the present invention, only one kind of the sulfonic acid (salt) group-containing monomers (B) may be used, or two or more kinds thereof may be used.

In the method of producing a (meth)acrylic acid-based copolymer of the present invention, only one kind of the (meth)acrylic acids (salts) (C) may be used, or two or more kinds thereof may be used.

In the method of producing a (meth)acrylic acid-based copolymer of the present invention, a usage ratio among the monomer (A), the monomer (B), and the (meth)acrylic acid (salt) (C) is 1 mass % to 20 mass %/1 mass % to 50 mass %/30 mass % to 98 mass %, preferably 1 mass % to 19 mass %/4 mass % to 45 mass %/36 mass % to 95 mass %, more preferably 1 mass % to 18 mass %/6 mass % to 40 mass %/42 mass % to 93 mass %, still more preferably 2 mass % to 17 mass %/7 mass % to 35 mass %/48 mass % to 91 mass %, particularly preferably 3 mass % to 15 mass %/8 mass % to 30 mass %/55 mass % to 89 mass %, most preferably 5 mass % to 15 mass %/10 mass % to 30 mass %/55 mass % to 85 mass % with respect to the usage amount of all monomers. In the method of producing a (meth)acrylic acid-based copolymer of the present invention, when the usage ratio among the monomer (A), the monomer (B), and the (meth)acrylic acid (salt) (C) is adjusted to fall within the range with respect to the usage amount of all monomers, the (meth)acrylic acid-based copolymer to be obtained by the production method of the present invention can express an excellent effect on the dispersion of hydrophobic particles. In the case where the usage ratio among the respective monomers deviates from the range, for example, when the usage amount of the monomer (A) is more than 20 mass %, the polymerizability of the monomers may reduce to increase the amount of a remaining monomer. In addition, when the usage amount of the monomer (A) is less than 1 mass %, the hydrophobic effect of the (meth)acrylic acid-based copolymer to be obtained may not be sufficiently expressed and hence the dispersing effect on the hydrophobic particles may reduce. Similarly, when any one of the usage amounts of the monomer (B) and the (meth)acrylic acid (salt) (C) deviates from the range, the dispersing effect on the dispersion of the hydrophobic particles may reduce.

In the method of producing a (meth)acrylic acid-based copolymer of the present invention, any other monomer (D) except the ether bond-containing hydrophobic monomer (A), the sulfonic acid (salt) group-containing monomer (B), and the (meth)acrylic acid (salt) (C) may be used to the extent that the effects of the present invention are not impaired.

The other monomer (D) that can be used in the method of producing a (meth)acrylic acid-based copolymer of the present invention is the same as that in the description of the (meth)acrylic acid-based copolymer of the present invention.

In the method of producing a (meth)acrylic acid-based copolymer of the present invention, the usage ratio of the other monomer (D) is preferably from 0 mass % to 68 mass %, more preferably from 0 mass % to 60 mass %, still more preferably from 0 mass % to 50 mass %, particularly preferably from 0 mass % to 40 mass % with respect to the usage amount of all monomers in view of being capable of expressing the effects of the present invention in an additionally effective manner.

In the method of producing a (meth)acrylic acid-based copolymer of the present invention, the monomers (the ether bond-containing hydrophobic monomer (A), the sulfonic acid (salt) group-containing monomer (B), and the (meth) acrylic acid (salt) (C), and as required, the other monomer (D)) are preferably polymerized in the presence of a polymerization initiator.

Any appropriate polymerization initiator can be adopted as the polymerization initiator to the extent that the effects of the present invention are not impaired. Examples of such polymerization initiator include: hydrogen peroxide; persulfates, such as sodium persulfate, potassium persulfate, and ammonium persulfate; azo-based compounds, such as dimethyl-2,2'-azobis(2-methyl propionate), 2,2'-azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), dimethyl 2,2'-azobis(isobutyrate), 4,4'-azobis(4-cyanovaleric acid), 2,2'-azobis(2-methylpropionamidine) dihydrochloride, 2,2'-azobis[N-(2-carboxyethyl)-2-methylpropionamidine] n-hydrate, 2,2'-azobis[2-(2-imidazolin-2-yl)propane] dihydrochloride, 2,2'-azobis[2-(2-imidazolin-2-yl)propane] disulfatedihydrate, and 1,1'-azobis(cyclohexane-1-carbonitrile); and organic peroxides, such as benzoyl peroxide, lauroyl peroxide, peracetic acid, di-t-butyl peroxide, and cumene hydroperoxide. Of those polymerization initiators, persulfates, such as sodium persulfate, potassium persulfate, and ammonium persulfate, are preferred because the effects of the present invention can be sufficiently expressed.

Only one kind of the polymerization initiators may be used, or two or more kinds thereof may be used.

Any appropriate amount can be adopted as the usage amount of the polymerization initiator as long as the amount enables appropriate initiation of the copolymerization reaction of the monomers. For example, such amount is preferably 15 g or less, more preferably from 1 g to 12 g in terms of sodium persulfate with respect to 1 mol of the whole amount of the monomers.

In the method of producing a (meth)acrylic acid-based copolymer of the present invention, a chain transfer agent may be used as required for the purpose of, for example, adjusting the molecular weight of the copolymer to be obtained to the extent that the copolymerization reaction is not adversely affected.

Any appropriate chain transfer agent can be adopted as the chain transfer agent to the extent that the effects of the present invention are not impaired. Examples of such chain transfer agent include: thiol-based chain transfer agents, such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecylmercaptan, octylmercaptan, and butyl thioglycolate; halides, such as carbon tetrachloride, methylene chloride, bromoform, and bromotrichloroethane; secondary alcohols, such as isopropanol and glycerin; and lower oxides and salts thereof, such as phosphorous acid, hypophosphorous acid, and salts thereof (e.g., sodium hypophosphite and potassium hypophosphite), and sulfurous acid, bisulfurous acid, dithionous acid, metabisulfurous acid, and salts thereof (e.g., sodium bisulfite, potassium bisulfite, ammonium bisulfite, sodium dithionite, potassium dithionite, sodium metabisulfite, and potassium metabisulfite). Of those chain transfer agents, bisulfites, such as sodium bisulfite, potassium bisulfite, and ammonium bisulfite, are preferred because the effects of the present invention can be sufficiently expressed.

Only one kind of the chain transfer agents may be used, or two or more kinds thereof may be used.

The use of the chain transfer agent has the following advantages: the molecular weight of the copolymer to be produced can be suppressed from increasing more than necessary; and a low-molecular weight copolymer can be efficiently produced.

Any appropriate amount can be adopted as the usage amount of the chain transfer agent as long as the amount enables appropriate progress of the copolymerization reaction of the monomers. For example, such amount is preferably from 0.5 g to 20 g, more preferably from 1 g to 15 g, still more preferably from 2 g to 10 g in terms of sodium bisulfite with respect to 1 mol of the whole amount of the monomers.

In the method of producing a (meth)acrylic acid-based copolymer of the present invention, a combination of one or more kinds each of persulfates and bisulfites is preferably used as a combination of the polymerization initiator and the chain transfer agent (also referred to as "initiator system") because the effects of the present invention can be expressed in an additionally sufficient manner.

Specific examples of the persulfate include sodium persulfate, potassium persulfate, and ammonium persulfate.

Specific examples of the bisulfite include sodium bisulfite, potassium bisulfite, and ammonium bisulfite.

With regard to a usage ratio when the persulfate and the bisulfite are used in combination, the amount of the bisulfite is preferably from 0.1 part by mass to 5 parts by mass, more preferably from 0.2 part by mass to 3 parts by mass, still more preferably from 0.2 part by mass to 2 parts by mass with respect to 1 part by mass of the persulfate. When the amount of the bisulfite is less than 0.1 part by mass with respect to 1 part by mass of the persulfate, an effect exhibited by the bisulfite may reduce. Accordingly, it may be difficult to express the effects of the present invention in an additionally sufficient manner. In addition, when the amount of the bisulfite is less than 0.1 part by mass with respect to 1 part by mass of the persulfate, the weight-average molecular weight of the (meth)acrylic acid-based copolymer to be obtained may become excessively high. When the amount of the bisulfite is more than 5 parts by mass with respect to 1 part by mass of the persulfate, an effect exhibited by the bisulfite commensurate with the usage ratio may not be obtained and the bisulfite may be excessively supplied (wastefully consumed) in a polymerization reaction system. Accordingly, an excess amount of the bisulfite may be decomposed in the polymerization reaction system to produce a large amount of a sulfurous acid gas. In addition, when the amount of the bisulfite is more than 5 parts by mass with respect to 1 part by mass of the persulfate, a large amount of impurities may be produced and hence the performance of the (meth)acrylic acid-based copolymer to be obtained may reduce. In addition, when the amount of the bisulfite is more than 5 parts by mass with respect to 1 part by mass of the persulfate, impurities may be liable to deposit upon low-temperature holding of the (meth)acrylic acid-based copolymer to be obtained.

With regard to a usage amount when the persulfate and the bisulfite are used in combination, the total amount of the persulfate and the bisulfite is preferably from 1 g to 20 g, more preferably from 2 g to 15 g, still more preferably from 3 g to 11 g, particularly preferably from 4 g to 8 g in terms of sodium persulfate and sodium bisulfite with respect to 1 mol of the whole amount of the monomers. When the total amount of the persulfate and the bisulfite is less than 1 g in terms of sodium persulfate and sodium bisulfite with respect to 1 mol of the whole amount of the monomers, it may be difficult to express the effects of the present invention in an additionally sufficient manner, and the weight-average molecular weight of the (meth)acrylic acid-based copolymer to be obtained may become excessively high. When the total amount of the persulfate and the bisulfite is more than 20 g with respect to 1 mol of the whole amount of the monomers, an effect exhibited by the persulfate and the bisulfite commensurate with their usage amounts may not be obtained, and the purity of the (meth)acrylic acid-based copolymer to be obtained may reduce. In addition, impurities may be liable to deposit upon low-temperature holding of the (meth)acrylic acid-based copolymer to be obtained.

The persulfate may be added in the form of a persulfate solution (preferably a persulfate aqueous solution) by being dissolved in a solvent to be described later (preferably water). The concentration of the persulfate when the persulfate is used as such persulfate solution (preferably the persulfate aqueous solution) is preferably from 1 mass % to 35 mass %, more preferably from 5 mass % to 30 mass %, still more preferably from 10 mass % to 20 mass %. When the concentration of the persulfate solution (preferably the persulfate aqueous solution) is less than 1 mass %, the transportation and storage of the solution may become complicated. When the concentration of the persulfate solution (preferably the persulfate aqueous solution) is more than 35 mass %, the solution may become difficult to handle.

The bisulfite may be added in the form of a bisulfite solution (preferably a bisulfite aqueous solution) by being dissolved in a solvent to be described later (preferably water). The concentration of the bisulfite when the bisulfite is used as such bisulfite solution (preferably the bisulfite aqueous solution) is preferably from 10 mass % to 42 mass %, more preferably from 20 mass % to 41 mass %, still more preferably from 32 mass % to 40 mass %. When the concentration of the bisulfite solution (preferably the bisulfite aqueous solution) is less than 10 mass %, the transportation and storage of the solution may become complicated. When the concentration of the bisulfite solution (preferably the bisulfite aqueous solution) is more than 42 mass %, the solution may become difficult to handle.

A continuous loading method, such as dropping or separate loading, can be applied as a method of adding the polymerization initiator and the chain transfer agent to a reaction vessel. In addition, the chain transfer agent may be introduced alone into the reaction vessel, or may be mixed in advance with, for example, the respective monomers constituting a monomer component and a solvent.

In the method of producing a (meth)acrylic acid-based copolymer of the present invention, at the time of the polymerization reaction, any appropriate other additive can be used in the polymerization reaction system to the extent that the effects of the present invention are not impaired. Examples of such other additive include a reaction accelerator, a heavy metal concentration adjustor, and a pH adjustor. The reaction accelerator is used for the purpose of, for example, reducing the usage amount of the polymerization initiator or the like. The heavy metal concentration adjustor is used for the purpose of, for example, alleviating an influence on the polymerization reaction occurring when a metal is eluted in a trace amount from the reaction vessel or the like. The pH adjustor is used for the purposes of, for example, improving the efficiency of the polymerization reaction, and preventing the occurrence of a sulfurous acid gas and the corrosion of an apparatus when the bisulfite is used as the initiator system.

For example, a heavy metal compound can be utilized as the reaction accelerator. Specific examples thereof can include: water-soluble polyvalent metal salts, such as vanadium oxytrichloride, vanadium trichloride, vanadyl oxalate, vanadyl sulfate, vanadic anhydride, ammonium metavanadate, ammonium hypovanadous sulfate $[(NH_4)_2SO_4 \cdot VSO_4 \cdot 6H_2O]$, ammonium vanadous sulfate $[(NH_4)V(SO_4)_2 \cdot 12H_2O]$, copper(II) acetate, copper(II), copper(II) bromide, copper(II) acetylacetate, cupric ammonium chloride, copper ammonium chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper(I) cyanide, copper iodide, copper(I) oxide, copper thiocyanate, iron acetylacetonate, iron ammonium citrate, ferric ammonium oxalate, iron ammonium sulfate, Mohr's salt, ferric ammonium sulfate, iron citrate, iron fumarate, iron maleate, ferrous lactate, ferric nitrate, iron pentacarbonyl, ferric phosphate, and ferric pyrophosphate; polyvalent metal oxides, such as vanadium pentaoxide, copper(II) oxide, ferrous oxide, and ferric oxide; polyvalent metal sulfides, such as iron(III) sulfide, iron(II) sulfide, and copper sulfide; copper powder; and iron powder. Only one kind of the reaction accelerators may be used, or two or more kinds thereof may be used.

A polyvalent metal compound or simple substance can be utilized as the heavy metal concentration adjustor. Specific examples thereof can include: water-soluble polyvalent metal salts, such as vanadium oxytrichloride, vanadium trichloride, vanadyl oxalate, vanadyl sulfate, vanadic anhydride, ammonium metavanadate, ammonium hypovanadous sulfate $[(NH_4)_2SO_4 \cdot VSO_4 \cdot 6H_2O]$, ammonium vanadous sulfate $[(NH_4)V(SO_4)_2 \cdot 12H_2O]$, copper(II) acetate, copper(II), copper(II) bromide, copper(II) acetylacetate, cupric ammonium chloride, copper ammonium chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper(I) cyanide, copper iodide, copper(I) oxide, copper thiocyanate, iron acetylacetonate, iron ammonium citrate, ferric ammonium oxalate, iron ammonium sulfate, Mohr's salt, ferric ammonium sulfate, iron citrate, iron fumarate, iron maleate, ferrous lactate, ferric nitrate, iron pentacarbonyl, ferric phosphate, and ferric pyrophosphate; polyvalent metal oxides, such as vanadium pentaoxide, copper(II) oxide, ferrous oxide, and ferric oxide; polyvalent metal sulfides, such as iron(III) sulfide, iron(II) sulfide, and copper sulfide; copper powder; and iron powder. Only one kind of the heavy metal concentration adjustors may be used, or two or more kinds thereof may be used.

Examples of the pH adjustor include: hydroxides of alkali metals, such as sodium hydroxide and potassium hydroxide; hydroxides of alkaline earth metals, such as calcium hydroxide and magnesium hydroxide; and organic amine salts, such as ammonia, monoethanolamine, and triethanolamine. Of those, hydroxides of alkali metals, such as sodium hydroxide and potassium hydroxide, are preferred, and sodium hydroxide is particularly preferred. It should be noted that the pH adjustor is sometimes referred to as "neutralizer". Only one kind of the pH adjustors may be used, or two or more kinds thereof may be used.

In the method of producing a (meth)acrylic acid-based copolymer of the present invention, the polymerization reaction is preferably performed in a solvent. Only one kind of the solvents may be used, or two or more kinds thereof may be used.

Any appropriate solvent can be adopted as the solvent to the extent that the effects of the present invention are not impaired. Such solvent is preferably an aqueous solvent, such as water, an alcohol, a glycol, glycerin, or a polyethylene glycol, and is more preferably water.

It should be noted that an organic solvent may be appropriately added for improving the solubility of each of the monomers in the solvent to the extent that the effects of the present invention are not impaired. Examples of such organic solvent include: lower alcohols, such as methanol and ethanol; amides, such as dimethylformaldehyde; and ethers, such as diethyl ether and dioxane. Only one kind of the organic solvents may be used, or two or more kinds thereof may be used.

The usage amount of the solvent is preferably from 40 mass % to 200 mass %, more preferably from 45 mass % to 180 mass %, still more preferably from 50 mass % to 150 mass % with respect to the whole amount of the monomers. When the usage amount of the solvent is less than 40 mass %, the weight-average molecular weight of the (meth)acrylic acid-based copolymer to be obtained may become excessively high. When the usage amount of the solvent is more than 200 mass %, the concentration of the (meth)acrylic acid-based copolymer to be obtained reduces, and in some cases, the solvent may need to be removed.

Most or the whole amount of the solvent only needs to be loaded into the reaction vessel at the initial stage of the polymerization. For example, part of the solvent may be properly added (dropped) alone in the reaction system during the polymerization, or the monomers, the polymerization initiator, the chain transfer agent, and the other additive may be dissolved in advance in the solvent before the solvent is properly added (dropped) in the reaction system during the polymerization together with these components.

In the method of producing a (meth)acrylic acid-based copolymer of the present invention, the polymerization temperature of the polymerization reaction can be set to any appropriate temperature to the extent that the effects of the present invention are not impaired. A lower limit for the polymerization temperature is preferably 50° C. or more, more preferably 70° C. or more, and an upper limit for the polymerization temperature is preferably 99° C. or less, more preferably 95° C. or less because the copolymer can be efficiently produced. In addition, the upper limit for the polymerization temperature may be set to any appropriate temperature equal to or lower than the boiling point of a polymerization reaction solution.

When the method of producing a (meth)acrylic acid-based copolymer of the present invention is a method in which the polymerization is initiated from room temperature (room temperature initiation method), e.g., when the polymerization is performed within 240 minutes per batch (180-minute formulation), the temperature of the reaction system is caused to reach a preset temperature, which falls within the range of the polymerization temperature, and is preferably from 70° C. to 95° C., more preferably from 80° C. to 90° C., within preferably from 0 minutes to 70 minutes, more preferably from 0 minutes to 50 minutes, still more preferably from 0 minutes to 30 minutes. After that, the preset temperature is preferably maintained till the end of the polymerization.

In the method of producing a (meth)acrylic acid-based copolymer of the present invention, a pressure in the reaction system can be set to any appropriate pressure to the extent that the effects of the present invention are not impaired. Examples of such pressure include normal pressure (atmospheric pressure), reduced pressure, and increased pressure.

In the method of producing a (meth)acrylic acid-based copolymer of the present invention, an atmosphere in the reaction system can be set to any appropriate atmosphere to the extent that the effects of the present invention are not impaired. Examples of such atmosphere include an air atmosphere and an inert gas atmosphere.

In the method of producing a (meth)acrylic acid-based copolymer of the present invention, the polymerization reaction of the monomers is preferably performed under an acidic condition. When the polymerization reaction is performed under the acidic condition, an increase in viscosity of the solution in the polymerization reaction system can be suppressed, and hence a low-molecular weight (meth)acrylic acid-based copolymer can be satisfactorily produced. Moreover, the polymerization reaction can be advanced under a higher concentration condition than a conventional one, and hence the production efficiency of the copolymer can be significantly improved. For example, when a degree of neutralization during the polymerization is adjusted to fall within the range of from 0 mol % to 25 mol %, an effect exhibited by a reduction in amount of the polymerization initiator can be synergistically increased, and hence a reducing effect on the amount of impurities can be markedly increased. Further, the pH of the reaction solution during the polymerization at 25° C. is preferably adjusted to fall within the range of from 1 to 6. When the polymerization reaction is performed under such acidic condition, the polymerization can be performed at a high concentration and in one stage. Accordingly, a concentrating step that has been necessary in some cases in a related-art production method can be omitted. Therefore, the productivity of the (meth)acrylic acid-based copolymer significantly improves and an increase in production cost therefor can be suppressed.

The pH of the reaction solution during the polymerization at 25° C. preferably falls within the range of from 1 to 6, more preferably falls within the range of from 1 to 5, and still more preferably falls within the range of from 1 to 4. When the pH of the reaction solution during the polymerization at 25° C. is less than 1, a sulfurous acid gas or the corrosion of the apparatus may occur in, for example, the case where the bisulfite is used as the initiator system. When the pH of the reaction solution during the polymerization at 25° C. is more than 6, in the case where the bisulfite is used as the initiator system, the efficiency with which the bisulfite is used may reduce and hence the molecular weight of the copolymer may increase.

For example, the pH adjustor only needs to be used in the adjustment of the pH of the reaction solution during the polymerization at 25° C.

The degree of neutralization during the polymerization preferably falls within the range of from 0 mol % to 25 mol %, more preferably falls within the range of from 1 mol % to 20 mol %, and still more preferably falls within the range of from 2 mol % to 15 mol %. When the degree of neutralization during the polymerization falls within such range, the monomers can be satisfactorily copolymerized and hence the amount of impurities can be reduced. In addition, the viscosity of the solution in the polymerization reaction system is prevented from increasing, and hence a low-molecular weight copolymer can be satisfactorily produced. Moreover, the polymerization reaction can be advanced under a higher concentration condition than the conventional one, and hence the production efficiency can be significantly improved.

Any appropriate method can be adopted as a method for neutralization to the extent that the effects of the present invention are not impaired. For example, a (meth)acrylate, such as sodium (meth)acrylate, may be used as part of the raw materials, a hydroxide of an alkali metal, such as sodium hydroxide, may be used as the neutralizer to perform the neutralization during the polymerization, or the (meth)acrylate and the hydroxide may be used in combination. In addition, with regard to the addition form of the neutralizer at the time of the neutralization, the neutralizer may be added in the form of a solid, or may be added in the form of an aqueous solution prepared by dissolving the neutralizer in a proper solvent (preferably water).

When the polymerization reaction is performed with the neutralizer in the form of an aqueous solution, the concentration of the aqueous solution is preferably from 10 mass % to 60 mass %, more preferably from 20 mass % to 55 mass %, still more preferably from 30 mass % to 50 mass %. When the concentration of the aqueous solution is less than 10 mass %, the transportation and storage of the solution may become complicated. When the concentration of the aqueous solution is more than 60 mass %, the solution may become difficult to handle.

At the time of the polymerization, the following is preferably adopted. The monomers, the polymerization initiator, and the chain transfer agent, and as required, the other additive are dissolved in advance in a proper solvent (preferably a solvent of the same kind as that of a solvent for a liquid to be dropped) to prepare a solution of the monomers, a solution of the polymerization initiator, and a solution of the chain transfer agent, and as required, a solution of the other additive, and the polymerization is performed while each of the solutions is continuously dropped to a solvent loaded into the reaction vessel (regulated to a predetermined temperature as required) over a predetermined dropping time. Further, part of the solvent may be dropped later separately from the initially loaded solvent that has been loaded in advance into the vessel in the reaction system. With regard to a dropping method, each solution may be continuously dropped, or may be intermittently dropped in several portions. In addition, part or the whole amount of one or two or more kinds of the monomers may be initially loaded. In addition, the rate at which one or two or more kinds of the monomers are dropped may be always constant during a time period from the initiation of the dropping to its end, or the dropping rate may be changed with time in accordance with, for example, the polymerization temperature. In addition, there is no need to drop all dropping components in the same manner, and the time point when the dropping is initiated or the time point when the dropping is ended may be shifted from dropping component to dropping component, or a dropping time may be shortened or lengthened from dropping component to dropping component. In addition, when the respective components are dropped in solution forms, each of the dropping solutions may be warmed to a temperature comparable to the polymerization temperature in the reaction system. With such procedure, when the polymerization temperature is kept constant, a temperature fluctuation is reduced and hence temperature control becomes easy.

When the bisulfite is used as the initiator system, the bisulfite causes the weight-average molecular weight of the copolymer at the initial stage of the polymerization to affect the final weight-average molecular weight. Accordingly, in order to reduce the weight-average molecular weight of the copolymer at the initial stage of the polymerization, the bisulfite or a solution thereof is added (dropped) at from 5 mass % to 35 mass % preferably within 60 minutes, more preferably within 30 minutes, still more preferably within 10 minutes from the time point when the polymerization is initiated.

When the bisulfite is used as the initiator system, the time point when the dropping of the bisulfite or the solution thereof is ended is made earlier than the time point when the dropping of the monomers is ended by preferably from 1 minute to 30 minutes, more preferably from 1 minute to 20 minutes, still more preferably from 1 minute to 15 minutes. Thus, the amount of the bisulfite remaining after the end of the polymerization can be reduced, and hence the occurrence of a sulfurous acid gas and the formation of impurities due to such remaining bisulfite can be significantly and effectively suppressed.

When the persulfate is used as the initiator system, the time point when the dropping of the persulfate or a solution thereof is ended is delayed from the time point when the dropping of the monomers is ended by preferably from 1 minute to 60 minutes, more preferably from 1 minute to 45 minutes, still more preferably from 1 minute to 20 minutes. Thus, the amount of a monomer remaining after the end of the polymerization can be reduced and hence the amount of impurities resulting from such remaining monomer can be reduced.

A total dropping time at the time of the polymerization is preferably from 150 minutes to 600 minutes, more preferably from 180 minutes to 450 minutes, still more preferably from 210 minutes to 300 minutes. When the total dropping time is less than 150 minutes, the weight-average molecular weight of the (meth)acrylic acid-based copolymer to be obtained may become excessively high. In addition, an excess amount of the bisulfite may be decomposed to produce a sulfurous acid gas. When the total dropping time is more than 600 minutes, the productivity of the (meth)acrylic acid-based copolymer to be obtained may reduce. It should be noted that the term "total dropping time" as used herein refers to a time period from the time point when the dropping of the first dropping component (which is not necessarily one component) is initiated to the time point when the dropping of the final dropping component (which is not necessarily one component) is completed.

A solid content concentration in the polymerization solution at the time point when the polymerization reaction is ended is preferably 35 mass % or more, more preferably from 40 mass % to 70 mass %, still more preferably from 45 mass % to 65 mass %. When the solid content concentration in the polymerization solution at the time point when the polymerization reaction is ended is 35 mass % or more, the polymerization can be performed at a high concentration and in one stage. Accordingly, a low-molecular weight (meth) acrylic acid-based copolymer can be efficiently obtained. For example, the concentrating step that has been necessary in some cases in the related-art production method can be omitted, and hence the production efficiency can be improved. As a result, the productivity of the (meth)acrylic acid-based copolymer improves and an increase in production cost therefor can be suppressed. Herein, the time point when the polymerization reaction is ended, which may be the time point when the dropping of all dropping components is ended, preferably means the time point when a predetermined aging time elapses after the dropping (time point when the polymerization is completed).

In the method of producing a (meth)acrylic acid-based copolymer of the present invention, an aging step of aging the polymerization reaction solution may be provided in order to effectively complete the polymerization after the end of the polymerization reaction. An aging time in the aging step is preferably from 1 minute to 120 minutes, more preferably from 5 minutes to 90 minutes, still more preferably from 10 minutes to 60 minutes in order to effectively complete the polymerization. It should be noted that the polymerization temperature is preferably applied to a temperature in the aging step. When the aging step is present in the method of producing a (meth)acrylic acid-based copolymer of the present invention, the polymerization time means the sum of the total dropping time and the aging time.

<<Application of (Meth)Acrylic Acid-Based Copolymer>>

The (meth)acrylic acid-based copolymer of the present invention or a (meth)acrylic acid-based copolymer obtained by the production method of the present invention can find use in, for example, a water treatment agent, a fiber treatment agent, a dispersant, a scale inhibitor (scale control chemical), a metal ion-sequestering agent, a thickener, various binders, an emulsifying agent, a skin care agent, and a hair care agent.

EXAMPLES

Now, the present invention is specifically described by way of Examples, but the present invention is not limited to these Examples. It should be noted that, unless otherwise stated, parts and % in Examples are by mass.

<Quantification Method for Acrylic Acid (Salt)>

The acrylic acid (salt) was quantified under the following conditions.

Measurement apparatus: AllianceHPLC system, manufactured by Waters Detector: UV detector (200 nm)
Column: SHODEX RSpak DE-413L, manufactured by Showa Denko K.K.
Temperature: 40.0° C.
Eluent: 0.1% phosphoric acid aqueous solution
Flow rate: 1.0 ml/min <Quantification Method for Sulfonic Acid (Salt) Group-Containing Monomer and Ether Bond-Containing Hydrophobic Monomer>

The sulfonic acid (salt) group-containing monomer and the ether bond-containing hydrophobic monomer were quantified under the following conditions.

Measurement apparatus: 8020 series, manufactured by Tosoh Corporation
Column: CAPCELL PAK C1 UG120, manufactured by Shiseido Co., Ltd.
Temperature: 40.0° C.
Eluent: 10 mmol/L disodium hydrogen phosphate aqueous solution (adjusted with phosphoric acid to pH 7)/acetonitrile=45/55 (volume ratio)
Flow rate: 1.0 ml/min
Detector: RI detector <Measurement Method for Weight-Average Molecular Weight of Copolymer>

The copolymer was measured for its weight-average molecular weight under the following conditions.

Apparatus: high-speed GPC apparatus (HLC-8320GPC), manufactured by Tosoh Corporation
Detector: RI detector
Columns: SHODEX Asahipak GF-310-HQ, GF-710-HQ, GF-1G 7B, manufactured by Showa Denko K.K.
Column temperature: 40° C.
Flow rate: 0.5 ml/min Calibration curve: POLYACRYLIC ACID STANDARD, manufactured by Sowa Science Corporation
Eluent: 0.1 N sodium acetate/acetonitrile=3/1 (mass ratio)
<Evaluation for Ability to Disperse Hydrophobic Particles (Talc)>
(1) 10 Grams of an aqueous solution of each evaluation sample having a solid content of 0.1% was produced in a 20-mL screw tube.
(2) Meanwhile, 1,000 g of a 1% aqueous solution of phosphoric acid was prepared in a 1-L beaker.
(3) Next, 30-mL test tubes each having an inner diameter of 16 mm were prepared in a number corresponding to the number of the evaluation samples, 0.9 g of talc was weighed in each of the test tubes, and 29.4 g of the 1% aqueous solution of phosphoric acid produced in the section (2) was loaded into the test tube.
(4) The sample aqueous solutions of the section (1) were loaded in amounts of 0.6 g each into the test tubes of the section (3), and the test tubes were capped with septa. Thus, an aqueous suspension containing 3% of talc and 20 ppm of a sample solid content was prepared in each test tube.
(5) Talc agglomerating in each test tube was loosened by lightly shaking the test tube, and then the test tube was slowly inverted 60 reciprocations. After that, the cap was removed, the test tube was left at rest in a horizontal and stable place for 5 minutes, and 5 mL of a supernatant after 5 minutes of the standing was collected with a volumetric pipette.
(6) The absorbance of the supernatant at 380 nm was measured with a UV-visible spectrophotometer "UV-1800" manufactured by Shimadzu Corporation. The absorbance was defined as a dispersing ability. A larger value for the absorbance means that the dispersing ability is higher.

Example 1

38.9 Grams of pure water and 0.0176 g of Mohr's salt (3 ppm in terms of the mass of iron(II) with respect to a total loading amount (The term "total loading amount" as used herein refers to the amount of all loaded substances including a neutralizing step after the completion of polymerization. The same holds true for the following.)) were loaded into a 2.5-L kiln made of SUS316 provided with a temperature gauge, a reflux condenser, and a stirring machine, and the temperature of the mixture was increased to 85° C. under stirring (initial loading).
Next, under stirring, 210.0 g of an 80 mass % aqueous solution of acrylic acid (hereinafter sometimes referred to as "80% AA"), 240.0 g of a 35% 2-acrylamido-2-methylpropanesulfonic acid (hereinafter sometimes referred to as "35% AMPS"), 14.0 g of 1-allyloxy-3-butoxypropanediol (hereinafter sometimes referred to as "PAB"), 66.5 g of a 15 mass % aqueous solution of sodium persulfate (hereinafter sometimes referred to as "15% NaPS"), 38.7 g of a 35 mass % aqueous solution of sodium bisulfite (hereinafter sometimes referred to as "35% SBS"), and 33.8 g of a 48% aqueous solution of sodium hydroxide (hereinafter sometimes referred to as "48% NaOH") were dropped from dropping nozzles separate from one another in a polymerization reaction system in a state having a constant temperature of 85° C. The dropping times of the respective dropping liquids were as follows: the 80% AA was dropped for 180 minutes, the 35% AMPS was dropped for 150 minutes, the 15% NaPS was dropped for 210 minutes, the 35% SBS was dropped for 175 minutes, and the 48% NaOH was dropped for 150 minutes. In addition, with regard to the time point when dropping was initiated, all the droppings of the respective dropping liquids were simultaneously initiated.
After the end of all the droppings, the reaction solution was further held at 85° C. and aged over 30 minutes. Thus, the polymerization was completed.
After that, 174.0 g of a 48% aqueous solution of sodium hydroxide was added to the resultant.
Thus, a copolymer (1) having a weight-average molecular weight Mw of 15,000 was obtained.
Details about the reaction conditions and the like are shown in Table 1.
In addition, the result of an evaluation for an ability to disperse hydrophobic particles is shown in Table 2.
It should be noted that the meanings of abbreviations in Table 1 are as described below.
AA: acrylic acid
AMPS: 2-acrylamido-2-methylpropanesulfonic acid
PAB: 1-allyloxy-3-butoxypropan-2-ol
IPN-HxO: hexene oxide adduct of isoprenol
ArB: allyl butyl ether
NaPS: sodium persulfate
SBS: sodium bisulfite
NaOH: sodium hydroxide Example 2

A copolymer (2) having a weight-average molecular weight Mw of 7,100 was obtained in the same manner as in Example 1 except that conditions shown in Table 1 were adopted.
Details about the reaction conditions and the like are shown in Table 1.
In addition, the result of an evaluation for an ability to disperse hydrophobic particles is shown in Table 2.

Example 3

A copolymer (3) having a weight-average molecular weight Mw of 12,000 was obtained in the same manner as in Example 1 except that conditions shown in Table 1 were adopted.
Details about the reaction conditions and the like are shown in Table 1.
In addition, the result of an evaluation for an ability to disperse hydrophobic particles is shown in Table 2.

Example 4

A copolymer (4) having a weight-average molecular weight Mw of 14,000 was obtained in the same manner as in Example 1 except that conditions shown in Table 1 were adopted.
Details about the reaction conditions and the like are shown in Table 1.
In addition, the result of an evaluation for an ability to disperse hydrophobic particles is shown in Table 2.

Example 5

A copolymer (5) having a weight-average molecular weight Mw of 31,000 was obtained in the same manner as in Example 1 except that conditions shown in Table 1 were adopted.
Details about the reaction conditions and the like are shown in Table 1.

Example 6

A copolymer (6) having a weight-average molecular weight Mw of 50,000 was obtained in the same manner as in Example 1 except that conditions shown in Table 1 were adopted.

Details about the reaction conditions and the like are shown in Table 1.

Example 7

A copolymer (7) having a weight-average molecular weight Mw of 170,000 was obtained in the same manner as in Example 1 except that conditions shown in Table 1 were adopted.

Details about the reaction conditions and the like are shown in Table 1.

Example 8

A copolymer (8) having a weight-average molecular weight Mw of 13,000 was obtained in the same manner as in Example 1 except that conditions shown in Table 1 were adopted.

Details about the reaction conditions and the like are shown in Table 1.

Comparative Example 1

A copolymer (C1) having a weight-average molecular weight Mw of 22,000 was obtained in the same manner as in Example 1 except that conditions shown in Table 1 were adopted.

Details about the reaction conditions and the like are shown in Table 1.

In addition, the result of an evaluation for an ability to disperse hydrophobic particles is shown in Table 2.

TABLE 1

|  |  | Comparative Example 1 | Example 1 | Example 2 | Example 3 |
|---|---|---|---|---|---|
| AA/AMPS/hydrophobic monomer Initial loading | (wt %) (mol %) | 80/20/0 92/8/0 | 65/30/5 84/13.5/2.5 | 60/30/10 81/14/5 | 75/10/15 89/4/7 |
| Mohr's salt | (g) (ppm) | 0.0176 3.0 | 0.0176 3.0 | 0.0176 3.0 | 0.0176 3.0 |
| Pure water Dropping | (g) | 48.6 | 38.9 | 41.0 | 90.3 |
| 80% AA | (g) (mol) | 210.0 2.3333 | 227.5 2.5278 | 187.5 2.0833 | 187.5 2.0833 |
| 35% AMPS M = 207 | (g) (mol) | 120.0 0.2029 | 240.0 0.4058 | 214.3 0.3623 | 57.1 0.0966 |
| Hydrophobic monomer | (g) (mol) | 0.0 0.0000 | 14.0 0.0745 | 25.0 0.1330 | 30.0 0.1596 |
| 15% NaPS | (g) (g/mol) | 55.8 3.3 | 66.5 3.3 | 57.0 3.3 | 51.7 3.3 |
| 35% SBS | (g) (g/mol) | 21.0 2.90 | 38.7 4.50 | 51.6 7.00 | 36.8 5.50 |
| 48% NaOH | (g) (mol) | 16.91 0.20 | 33.82 0.41 | 30.19 0.36 | 8.05 0.10 |
| Dropping time |  |  |  |  |  |
| 80% AA | (min) | 0-180 | 0-180 | 0-180 | 0-180 |
| 35% AMPS | (min) | 0-150 | 0-150 | 0-150 | 0-150 |
| Hydrophobic monomer | (min) | — | 0-150 | 0-150 | 0-150 |
| 15% NaPS | (min) | 0-210 | 0-210 | 0-210 | 0-210 |
| 35% SBS | (min) | 0-175 | 0-175 | 0-175 | 0-175 |
| 48% NaOH | (min) | 0-150 | 0-150 | 0-150 | 0-150 |
| Aging time | (min) | 210-240 | 210-240 | 210-240 | 210-240 |
| Polymerization-aging temperature | (° C.) | 85.0 | 85.0 | 85.0 | 85.0 |
| Degree of neutralization after dropping | (%) | 8.0 | 13.8 | 14.8 | 4.4 |
| Solid content after dropping Posttreatment | (%) | 48.7 | 47.4 | 46.9 | 48.3 |
| 48% NaOH | (g) (mol) | 162.7 1.9529 | 174.0 2.0877 | 143.0 1.7165 | 146.4 1.7563 |
| Final degree of neutralization | (%) | 85.0 | 85.0 | 85.0 | 85.0 |
| Final solid content | (%) | 43.0 | 43.0 | 43.0 | 43.0 |
| Total loading amount | (g) | 635.1 | 833.4 | 749.6 | 607.9 |
| Kind of hydrophobic monomer |  | — | PAB | PAB | PAB |
| Mw of copolymer |  | 22,000 | 15,000 | 7,100 | 12,000 |
| Remaining AA | (ppm) | 26 | 3 | 9 | 41 |
| Remaining AMPS | (ppm) | 0 | 0 | 0 | 0 |
| Remaining hydrophobic monomer | (ppm) | 0 | 0 | 0 | 0 |

TABLE 1-continued

|  |  | Example 4 | Example 5 | Example 6 | Example 7 | Example 8 |
|---|---|---|---|---|---|---|
| AA/AMPS/hydrophobic monomer Initial loading | (wt %) | 65/30/5 | 70/20/10 | 89/10/1 | 89/10/1 | 65/30/5 |
|  | (mol %) | 83/13/4 | 86/9/5 | 95.8/3.8/0.4 | 95.8/3.8/0.4 | 83/13/4 |
| Mohr's salt | (g) | 0.0176 | 0.0176 | 0.0176 | 0.0176 | 0.0176 |
|  | (ppm) | 3.0 | 3.0 | 3.0 | 3.0 | 3.0 |
| Pure water | (g) | 14.0 | 61.5 | 186.8 | 188.5 | 21.1 |
| Dropping |  |  |  |  |  |  |
| 80% AA | (g) | 81.3 | 175.0 | 556.3 | 556.3 | 81.3 |
|  | (mol) | 0.9028 | 1.9444 | 6.1806 | 6.1806 | 0.9028 |
| 35% AMPS | (g) | 85.7 | 114.3 | 142.9 | 142.9 | 85.7 |
| M = 207 | (mol) | 0.1449 | 0.1932 | 0.2415 | 0.2415 | 0.1449 |
| Hydrophobic monomer | (g) | 5.0 | 20.0 | 5.0 | 5.0 | 5.0 |
|  | (mol) | 0.0268 | 0.1064 | 0.0266 | 0.0266 | 0.0438 |
| 15% NaPS | (g) | 23.8 | 49.6 | 142.6 | 142.6 | 24.1 |
|  | (g/mol) | 3.3 | 3.3 | 3.3 | 3.3 | 3.3 |
| 35% SBS | (g) | 13.8 | 19.2 | 18.4 | 9.2 | 14.0 |
|  | (g/mol) | 4.50 | 3.00 | 1.00 | 0.50 | 4.50 |
| 48% NaOH | (g) | 12.08 | 16.10 | 20.13 | 20.13 | 12.08 |
|  | (mol) | 0.14 | 0.19 | 0.24 | 0.24 | 0.14 |
| Dropping time |  |  |  |  |  |  |
| 80% AA | (min) | 0-180 | 0-180 | 0-180 | 0-180 | 0-180 |
| 35% AMPS | (min) | 0-150 | 0-150 | 0-150 | 0-150 | 0-150 |
| Hydrophobic monomer | (min) | 0-150 | 0-150 | 0-150 | 0-150 | 0-150 |
| 15% NaPS | (min) | 0-210 | 0-210 | 0-210 | 0-210 | 0-210 |
| 35% SBS | (min) | 0-175 | 0-175 | 0-175 | 0-175 | 0-175 |
| 48% NaOH | (min) | 0-150 | 0-150 | 0-150 | 0-150 | 0-150 |
| Aging time | (min) | 210-240 | 210-240 | 210-240 | 210-240 | 210-240 |
| Polymerization-aging temperature | (° C.) | 85.0 | 85.0 | 85.0 | 85.0 | 85.0 |
| Degree of neutralization after dropping | (%) | 13.8 | 9.0 | 3.8 | 3.8 | 13.8 |
| Solid content after dropping | (%) | 47.4 | 47.9 | 49.7 | 49.8 | 47.2 |
| Posttreatment |  |  |  |  |  |  |
| 48% NaOH | (g) | 62.1 | 135.3 | 434.8 | 434.8 | 62.1 |
|  | (mol) | 0.7456 | 1.6238 | 5.2172 | 5.2172 | 0.7456 |
| Final degree of neutralization | (%) | 85.0 | 85.0 | 85.0 | 85.0 | 85.0 |
| Final solid content | (%) | 43.0 | 43.0 | 43.0 | 43.0 | 43.0 |
| Total loading amount | (g) | 297.8 | 591.0 | 1,506.8 | 1,499.3 | 305.5 |
| Kind of hydrophobic monomer |  | IPN-HxO | PAB | PAB | PAB | ArB |
| Mw of copolymer |  | 14,000 | 31,000 | 50,000 | 170,000 | 13,000 |
| Remaining AA | (ppm) | 28 | 75 | 43 | 63 | 28 |
| Remaining AMPS | (ppm) | 0 | 0 | 0 | 0 | 0 |
| Remaining hydrophobic monomer | (ppm) | 0 | 0 | 0 | 0 | 0 |

TABLE 2

|  | Talc-dispersing ability |
|---|---|
| Comparative Example 1 | 0.330 |
| Example 1 | 0.604 |
| Example 2 | 0.350 |
| Example 3 | 0.397 |
| Example 4 | 0.785 |

As is apparent from Table 2, it was able to be confirmed that the (meth)acrylic acid-based copolymer of the present invention or a (meth)acrylic acid-based copolymer obtained by the production method of the present invention was improved in ability to disperse hydrophobic particles by the introduction of a specific amount of a structural unit derived from an ether bond-containing hydrophobic monomer in addition to a specific amount of a structural unit derived from a sulfonic acid (salt) group-containing monomer and a specific amount of a structural unit derived from (meth)acrylic acid (salt).

INDUSTRIAL APPLICABILITY

The (meth)acrylic acid-based copolymer of the present invention or a (meth)acrylic acid-based copolymer obtained by the production method of the present invention can be used in any appropriate application. Examples of such application include an agglomerating agent, a thickener, a pressure-sensitive adhesive, an adhesive, a surface coating agent, a cross-linking agent for inorganic fibers, a cross-linking agent for organic fibers, and a cross-linkable composition. More specific examples thereof include a pigment dispersant, a heavy metal scavenger, a scale inhibitor, a metal surface treatment agent, a dyeing aid, a dye-fixing agent, a foam stabilizer, an emulsion stabilizer, an ink dye dispersant, an aqueous ink stabilizer, a pigment dispersant for paints, a thickener for paints, a pressure-sensitive adhesive, an adhesive for paper, a glue stick, a medical adhesive, a pressure-sensitive adhesive for patches, a pressure-sensitive adhesive for cosmetic packs, a filler dispersant for resins, a hydrophilizing agent for resins, a coating agent for recording paper, a surface treatment agent for inkjet paper, a dispersant for photosensitive resins, an antistatic agent, a humectant, a binder for fertilizers, a binder for pharmaceutical tablets, a resin compatibilizer, a photographic chemical additive, a cosmetic dispensing additive, a hair dressing aid, a hair spray additive, and an additive for sunscreen compositions.

The invention claimed is:

1. A (meth)acrylic acid-based copolymer, comprising:
   1 mass % to 20 mass % of a structural unit (a) derived from an ether bond-containing hydrophobic monomer (A) represented by the general formula (1);
   1 mass % to 50 mass % of a structural unit (b) derived from a sulfonic acid (salt) group-containing monomer (B) represented by the general formula (6); and
   30 mass % to 98 mass % of a structural unit (c) derived from (meth)acrylic acid (salt) (C):

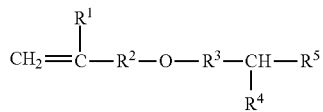

(1)

in the general formula (1), $R^1$ represents a hydrogen atom or a methyl group, $R^2$ represents an alkylene group having 1 to 10 carbon atoms, $R^3$ represents an alkylene group having 1 to 10 carbon atoms, $R^4$ represents H or a hydroxyl group, $R^5$ represents an $-OR^6$ group or $R^6$, and $R^6$ represents an alkyl group having 1 to 20 carbon atoms;

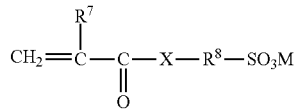

(6)

in the general formula (6), $R^7$ represents a hydrogen atom or a methyl group, X represents $-NH-$ or $-O-$, $R^8$ represents an alkylene group having 1 to 10 carbon atoms, and M represents a hydrogen atom, a metal atom, an ammonium group, which constitutes an ammonium salt, i.e., $SO_3NH_4$, or an organic amino group, which constitutes an organic amine salt.

2. The (meth)acrylic acid-based copolymer according to claim 1, wherein the (meth)acrylic acid-based copolymer has a weight average molecular weight of 3000-100,000.

3. The (meth)acrylic acid-based copolymer according to claim 1, wherein the ether bond-containing hydrophobic monomer (A) is at least one selected from the group consisting of a 1-allyloxy-3-butoxypropan-2-ol represented by the chemical formula (2), a hexene oxide adduct of isoprenol represented by the chemical formula (3), and allyl butyl ether represented by the chemical formula (4),

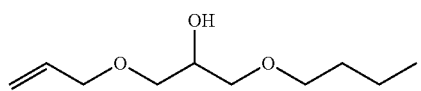

(2)

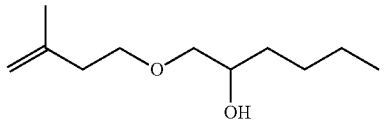

(3)

(4)

4. The (meth)acrylic acid-based copolymer according to claim 1, comprising 2 mass % to the 17 mass % of the structure unit (a) derived from the ether bond-containing hydrophobic monomer (A), 7 mass % to 35 mass % of the structural unit (b) derived from the sulfonic acid (salt) group-containing monomer (B), and 48 mass % to 91 mass % of the structural unit (c) derived from (meth)acrylic acid (salt) (C).

5. The (meth)acrylic acid-based copolymer according to claim 1, wherein the sulfonic acid (salt) group-containing monomer (B) is content monomer (B) is 2-acrylamido-2-methylpropanesulfonic acid.

6. A method of producing a (meth)acrylic acid-based copolymer,
   the method comprising polymerizing monomers including an ether bond-containing hydrophobic monomer (A) represented by the general formula (1), a sulfonic acid (salt) group-containing monomer (B) represented by the general formula (6), and (meth)acrylic acid (salt) (C) to produce a (meth)acrylic acid-based copolymer,
   the monomer (A), the monomer (B), and the (meth)acrylic acid (salt) (C) being used at a ratio of 1 mass % to 20 mass %/1 mass % to 50 mass %/30 mass % to 98 mass %:

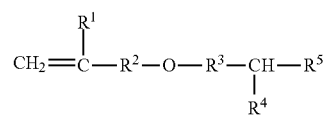

(1)

in the general formula (1), $R^1$ represents a hydrogen atom or a methyl group, $R^2$ represents an alkylene group having 1 to 10 carbon atoms, $R^3$ represents an alkylene group having 1 to 10 carbon atoms, $R^4$ represents H or a hydroxyl group, $R^5$ represents an $-OR^6$ group or $R^6$, and $R^6$ represents an alkyl group having 1 to 20 carbon atoms;

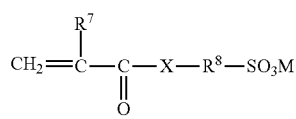

(6)

in the general formula (6), $R^7$ represents a hydrogen atom or a methyl group, X represents $-NH-$ or $-O-$, $R^8$ represents an alkylene group having 1 to 10 carbon atoms, and M represents a hydrogen atom, a metal atom, an ammonium group, which constitutes an ammonium salt, i.e., $SO_3NH_4$, or an organic amino group, which constitutes an organic amine salt.

7. The method of producing a (meth)acrylic acid-based copolymer according to claim 6, wherein the (meth)acrylic acid-based copolymer has a weight average molecular weight of 3000-100,000.

8. The method of producing a (meth)acrylic acid-based copolymer according to claim 6, wherein the ether bond-containing hydrophobic monomer (A) is at least one selected from the group consisting of a 1-allyloxy-3-butoxypropan-2-ol represented by the chemical formula (2), a hexene oxide adduct of isoprenol represented by the chemical formula (3), and allyl butyl ether represented by the chemical formula (4),

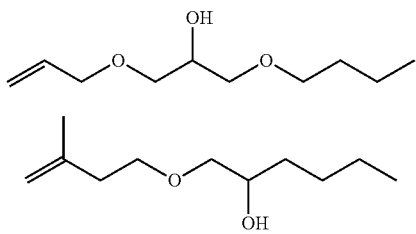

(2)

(3)

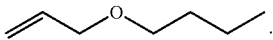

(4)

9. The method of producing a (meth)acrylic acid-based copolymer according to claim 6, comprising 2 mass % to the 17 mass % of the structure unit (a) derived from the ether bond-containing hydrophobic monomer (A), 7 mass % to 35 mass % of the structural unit (b) derived from the sulfonic acid (salt) group-containing monomer (B), and 48 mass % to 91 mass % of the structural unit (c) derived from (meth) acrylic acid (salt) (C).

10. The method of producing a (meth)acrylic acid-based copolymer according to claim 6, wherein the sulfonic acid (salt) group-containing monomer (B) is content monomer (B) is 2-acrylamido-2-methylpropanesulfonic acid.

* * * * *